United States Patent

Schmidt et al.

[11] Patent Number: 5,605,072
[45] Date of Patent: Feb. 25, 1997

[54] LOAD-ISOLATED, SINGLE-CYCLE MECHANISM

[75] Inventors: John A. Schmidt, Lexington; Kevin D. Schoedinger, Nicholasville, both of Ky.

[73] Assignee: Lexmark International, Inc., Lexington, Ky.

[21] Appl. No.: 528,068

[22] Filed: Sep. 14, 1995

[51] Int. Cl.$^6$ .................. F16H 55/17; F16H 29/12
[52] U.S. Cl. .................. 74/435; 74/84 R; 74/112; 192/126
[58] Field of Search .................. 74/84 R, 112, 74/113, 435; 192/33 R, 20, 126, 127

[56] References Cited

U.S. PATENT DOCUMENTS

| | | | |
|---|---|---|---|
| 3,069,183 | 12/1962 | Williamson | 74/435 |
| 4,812,065 | 3/1989 | Shimogawara et al. | 74/435 X |
| 5,097,162 | 3/1992 | Wang | 310/49 R |
| 5,284,064 | 2/1994 | Green et al. | 74/435 |
| 5,531,132 | 7/1996 | Koshino | 74/435 |

Primary Examiner—Charles A. Marmor
Assistant Examiner—David M. Fenstermacher
Attorney, Agent, or Firm—John A. Brady

[57] ABSTRACT

A driven gear (3a), a gear (11a) to a rotary solenoid (15a) and an output drive gear (19a) are mounted to rotate together, preferably as one part turning on a stationary shaft (7a). The driven gear and the output drive gear have disengagement sectors (5a and 20a). Activation of the solenoid turns the driven gear into engagement with a normally turning drive gear (1a). Shortly after the sector on the output gear is cleared, and the load (27) is driven through engagement with driven gear (23a). After one cycle, the detent force of the solenoid positions the sector 5a so that engagement is terminated. Because the rotary solenoid need only move the gears 3a, 11a and 19a, the size of the load is immaterial to the physical requirements for the solenoid and its reliability of operation.

13 Claims, 2 Drawing Sheets

LOAD-ISOLATED, SINGLE-CYCLE MECHANISM

TECHNICAL FIELD

This invention relates to mechanism to receive turning force from a power source and to transmit that force to a driven shaft for one cycle and selectably. A primary application for such mechanism is to turn a paper feed shaft carrying a friction roller which moves paper off the top of the stack of paper. This invention is an improvement of a previous mechanism to physically isolate the control mechanism from the driven load.

BACKGROUND OF THE INVENTION

A quiet, single-cycle mechanism improved by this invention is the subject of U.S. Pat. No. 5,284,064 to Green et al, which is assigned to the assignee of this invention. That mechanism is entirely effective for its purpose so long as the rotary solenoid which initiates each cycle can adequately move the load, since in the embodiments shown the rotary solenoid is directly linked to the load.

At actuation of those embodiments, the solenoid actuator must rotate the entire load, specifically a paper pick assembly, into the drive gear. As a result, the solenoid is exposed to various disturbances. This invention separates the actuator from the load and therefore permits the solenoid to function without interaction with the paper pick assembly or other load.

DISCLOSURE OF THE INVENTION

In accordance with this invention the rotary solenoid drives a gear having an axially mounted first gear with a blank sector opposite the drive gear, which meshes with the drive gear except at the blank sector. On that member having that first gear is a second, axially mounted gear with a blank sector opposite a driven gear, which meshes with the driven gear except at the blank sector. The driven gear is integral with the load. In this configuration, the solenoid need only move the three gears, not the load.

This invention employs magnetic detenting to reduce noise. A component of this invention is a device which may be rotated by electrical input, which has a detent position which is defined magnetically by the device and which may be overcome by predetermined force while the device remains capable of automatic detenting on relief of such force. Such a device is disclosed in U.S. Pat. No. 5,097,162 to Wang and is offered commercially by Philips Technologies of North American Philips Corp. under the commercial name "Torquer" stepper motor.

A single cycle is selected by pulsing the rotary solenoid to rotate sufficiently to move the blank sector opposite the drive gear enough for those two gears to engage. The sector of the gear facing the driven gear is preferably large enough so that is not engaged immediately when the gear opposite the drive gear is engaged. Upon engagement of the drive gear, the two sectored gears are rotated and the driven gear is engaged when the sector of the gear facing it is moved further.

As with the prior device of the foregoing patent, the detent force of the rotary solenoid is overcome by the higher force from the drive gear, and the rotary solenoid continues to move. At the end of one cycle the blank sector opposite the drive gear again faces the drive gear, which disconnects the drive gear from the driven gear. The detent force of the rotary solenoid then predominates, causing the solenoid to seek the detent position and hold the blank sector opposite the drive gear to thereby terminate a cycle. The blank sector of the driven gear necessarily also faces the driven gear and is therefore disengaged. Another cycle is initiated by pulsing the rotary solenoid.

Preferably the two sectored gears and the gear to the solenoid are single part mounted for rotation on a supporting shaft. Because the rotary solenoid need only move the assembly of the three gears, the size of the load is immaterial to the physical requirements for the solenoid and its reliability of operation. The driven gear is connected to the work performing member or load. This invention is designed for efficient operation when the load requires a force for operation by the solenoid which is greater than can be effectively provided from the solenoid.

BRIEF DESCRIPTION OF THE DRAWINGS

The details of this invention will be described in connection with the accompanying drawings, in which.

BEST MODE FOR CARRYING OUT THE INVENTION

Figure 1:
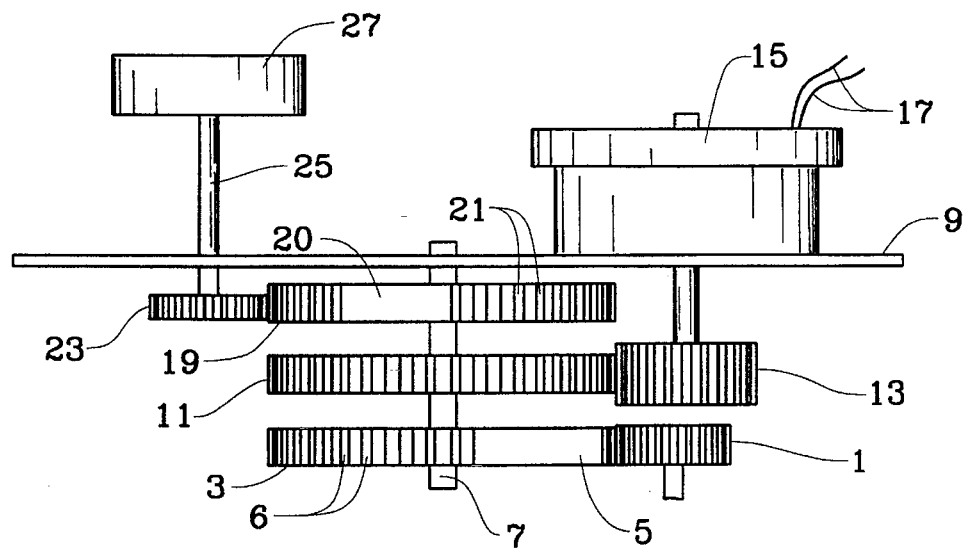
FIG. 1 is an illustrative perspective view to illustrate the novel aspect of this invention.

FIG. 1 is exaggerated in spacing and configured to illustrate this invention. Drive gear 1 receives turning power from a motor (not shown) or other conventional source. Gear 1 is positioned to mesh with first gear 3 opposite gear 1 and having a depressed or blank segment 5 in circumferential teeth 6. When blank segment 5 faces gear 1, gear 1 turns freely without meshing with gear 3. For illustration by FIG. 1 gear 3 is integral with driven shaft 7, which is supported by frame 9. Integral with shaft 7 is gear 11. Gear 11 meshes with gear 13 which is integral with rotary solenoid 15. Solenoid 15 has control electrical leads 17. Also integral with shaft 7 is second gear 19 having a depressed or blank segment 20 of teeth 21. Driven gear 23 is positioned to mesh with gear 19. When blank segment 20 is opposite gear 23, gear 19 can turn a short distance without meshing with gear 23. Gear 23 is integral with shaft 25, which turns the load, shown illustratively as a paper pick D roller 27.

FIG. 1 illustrates the relationship of the parts during a cycle of operation so as to show an unobstructed view of segments 5 and 20. Between operations the segment 5 faces drive gear 1 and therefore gear 3 is disengaged from drive gear 1. Similarly, segment 20 faces driven gear 23 and therefore gear 23 is disengaged from gear 19. Gear 11 is held in position by the detent force of solenoid 15.

To start a cycle of operation, rotary solenoid 15 is electrically driven through leads 17. This causes solenoid 15 to turn gear 11, which turns gear 3 a sufficient amount to move segment 5 past drive gear 1 and thereby cause the teeth 6 of gear 3 to mesh with the teeth of gear 1. Drive gear 1 is continually driven during normal operation. Drive gear 1 is turned with sufficient force to overcome the detent force of solenoid 15, and therefore gear 3 continues to turn which turns shaft 7, gear 11 and gear 19. Immediately after gear 1 begins to turn shaft 7, the blank segment 20 of gear 19 passes gear 23 and the teeth of gear 23 engage the teeth 21 of gear 19. Gear 23 is integral with shaft 25 and thereby turns D roller 27. The teeth of gear 11 mesh with the teeth of gear 13 to thereby turn gear 13, which is integral with the internal turning mechanism of solenoid 15.

At the end of one revolution of shaft 7, blank segment 5 again faces drive gear 1, which disengages drive gear 1 from gear 3. The detent force of solenoid 15 then controls and the mechanism is held in the position in which sector 5 faces gear 1 and sector 20 faces gear 23.

If gears 3, 11 and 19 are side by side they may be integral by being molded as one piece. They then may be supported by and turn on shaft 7, further reducing the body turned to initiate operation. The center portions of gears 3, 11 and 20 surrounding shaft 7 function as does the shaft 7 when the gears are integral with shaft 7 as discussed with FIG. 1.

Figure 2:
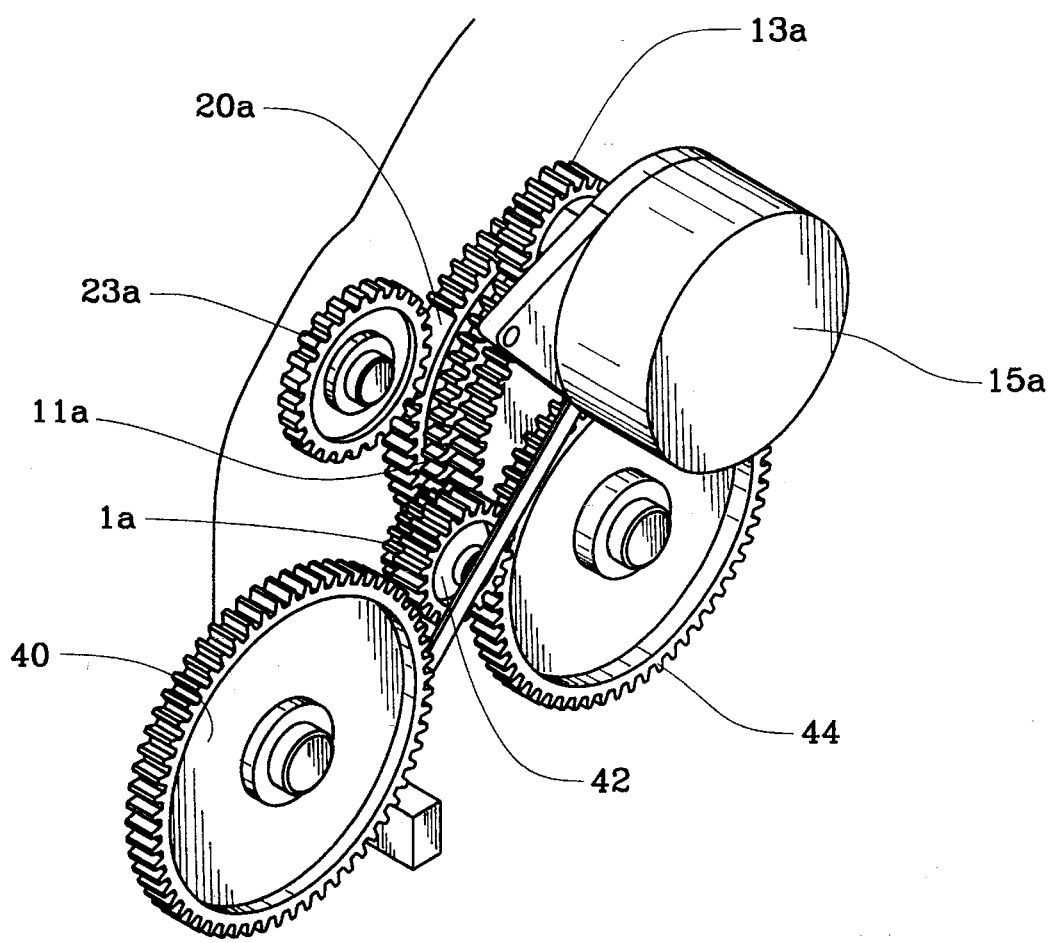
FIG. 2 is a perspective view of a preferred implementation of this invention.
Figure 3:
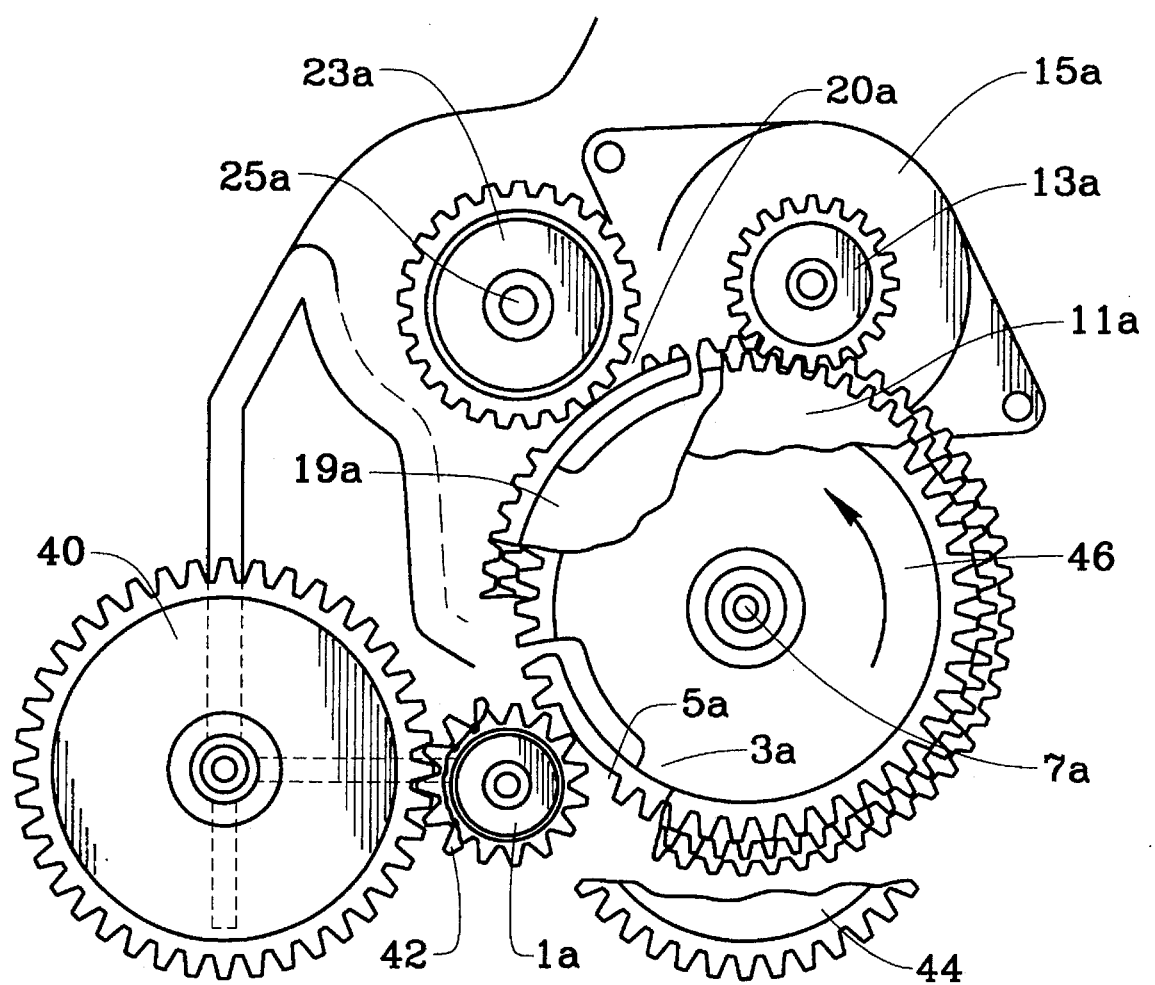
FIG. 3 is a side view of that preferred implementation.

FIG. 2 and FIG. 3 are two views of the preferred embodiment. Elements corresponding to those of FIG. 1 are given the same number with the subscript a. First gear 3a, second gear 11a, and third gear 19a are molded of one piece and turn around their central support shaft 7a. These views show the mechanism in the detent position. In addition to the elements of FIG. 1, the views show an additional driven train of gears 40, 42, and 44 which power other elements of the system. Gear 1a is inside of and integral with gear 42. FIG. 3 is a side view having an arrow 46 showing the direction of rotation when the mechanism is in operation. Parts of the mechanism are shown cut away so that the two segments 5a and 20a, which are shown opposite to and therefore disengaged with drive gear 1a load-driving 23a respectively.

Operation is as described with FIG. 1. Solenoid 15a is pulsed, causing clockwise movement of gear 13a. This causes the segment 5a of gear 3a to move past gear 1 a and then engagement of gear 1a to gear 3a. Shortly thereafter, under movement then controlled by gear 1a, the segment 20a passes gear 23a and then gear 19a engages with gear 23a. Solenoid 15a is rotated under the superior force of gear 1a, but when segment 5a comes to face gear 1a again, the detent force of solenoid 15a is the only positive force and stops gears 3a, 11a and 19a with segment 5a facing gear 1a, the position described as that at the start of a cycle. Mechanism attached to shaft 25a is thereby driven through a single cycle.

The cantilevered teeth of gears 3a and 19a of FIG. 3 are a known technique to improve noise-free engagement of the gears. As discussed in the foregoing patent, the solenoid 15a could be on the same shaft as gear 11 if other space considerations can be satisfied.

When in the home or detent state, the actuating mechanism, particularly solenoid 15, is isolated from the load by the segment 20. Since segment 20 is large enough so that gear 23 is not engaged until after gear 1 is engaged, the actuating mechanism never drives gear 23 or any load attached to gear 23. Therefore, the actuating mechanism only sees the frictional and inertial loads of the actuating mechanism itself, comprising gears 3, 11, and 19, as well as solenoid 15 itself. The resulting low power requirement facilitates reliable and economic operation. Such a low cost mechanism may be used with large loads with virtually no added requirement on the actuating mechanism.

The operation of this improvement continues to function without mechanical impacts or scraping, and the mechanism is therefore very quiet.

Various other alternative and modifications can be anticipated in accordance with the foregoing.

What is claimed is:

1. In a single-cycle, driven-member selection apparatus comprising a drive gear driven by a rotating power source, a driven member, a first gear axially mounted on and integral with said driven member, said drive gear having peripheral engaging means with said first gear except at a sector of said first gear, an angularly rotatable solenoid seeking a detent position which may be overcome by a predetermined force and permitting full circumferential rotation of said solenoid without impairing said operation of said solenoid, said driven member being operatively mounted for rotation by rotation of said first gear and being operatively mounted for rotation by rotation of said solenoid, the detent position of said solenoid being a location at which said drive gear faces said sector, the improvement comprising a driven gear and a second gear axially mounted on and integral with said driven member, said second gear having peripheral engaging means with said driven gear except at a sector of said second gear, said sector of said first gear facing said drive gear when said sector of said second gear faces said driven gear.

2. The single-cycle apparatus as in claim 1 in which said sector of said second gear is located for engagement of said driven gear with said second gear after engagement of said first gear and said driven gear during operation of said apparatus.

3. The single-cycle apparatus as in claim 2 in which said driven gear is connected to a work performing member requiring a force for operational movement greater than effectively available from said solenoid.

4. The single-cycle apparatus as in claim 1 in which said driven gear is connected to a work performing member requiring a force for operation movement greater than effectively available from said solenoid.

5. The single-cycle apparatus as in claim 4 also comprising a support shaft, and a gear driven by said solenoid, said first gear, said gear driven by said solenoid and said second gear being a single part mounted on said support shaft for rotation around said support shaft.

6. The single-cycle apparatus as in claim 1 also comprising a support shaft, and a gear driven by said solenoid, said first gear, said gear driven by said solenoid and said second gear being a single part mounted on said support shaft for rotation around said support shaft.

7. The single-cycle apparatus as in claim 2 also comprising a support shaft, and a gear driven by said solenoid, said first gear, said gear driven by said solenoid and said second gear being a single part mounted on said support shaft for rotation around said support shaft.

8. The single-cycle apparatus as in claim 3 also comprising a support shaft, and a gear driven by said solenoid, said first gear, said gear driven by said solenoid and said second gear being a single part mounted on said support shaft for rotation around said support shaft.

9. A single-cycle, driven-member selection apparatus comprising a drive gear, a support shaft, a single part comprising a first gear, a second gear, and a third gear, said single part being mounted on said support shaft for rotation around said support shaft, said drive gear having peripheral engaging means with said first gear except at a sector of said first gear, an angularly rotatable solenoid seeking a detent position which may be overcome by a predetermined force and permitting full circumferential rotation of said solenoid without impairing said operation of said solenoid, said second gear being operatively mounted for rotation by rotation of said solenoid, the detent position of said solenoid being a location at which said drive gear faces said sector, and a load-driving member, said third gear being located to engage said load-driving member.

10. The single-cycle apparatus as in claim 9 in which said load-driving member comprises a fourth gear axially mounted integral with and on a driven shaft, said third gear having peripheral engaging means with said fourth gear except at a sector of said third gear.

11. The single-cycle apparatus as in claim 10 in which said sector of said third gear is located for engagement of said fourth gear with said third gear after engagement of said first gear and said drive gear during operation of said apparatus.

12. The single-cycle apparatus as in claim 11 in which said fourth gear is connected to a work performing member requiring a force for operational movement greater than effectively available from said solenoid.

13. The single-cycle apparatus as in claim 10 in which said fourth gear is connected to a work performing member requiring a force for operational movement greater than effectively available from said solenoid.

* * * * *